Jan. 17, 1961    H. J. WALTER    2,968,218

SLIDE BOX MAGAZINE MEANS

Filed Jan. 21, 1958

*INVENTOR.*
HENRY J. WALTER

United States Patent Office 2,968,218
Patented Jan. 17, 1961

2,968,218

SLIDE BOX MAGAZINE MEANS

Henry J. Walter, Bethpage, N.Y., assignor to Viewlex, Inc., Long Island City, N.Y., a corporation of New York Filed Jan. 21, 1958, Ser. No. 710,278

1 Claim. (Cl. 88—28)

This invention relates to slide magazines primarily for slide projector or viewer means and more particularly to removable slide box magazines.

More particularly the invention relates to means for transporting slides to and from a box magazine with rotational movement to eliminate interference between the edges of the slide mounts.

Conventional slide projectors generally have a slide magazine of the type which is relatively long and which is open on top. The slides are placed in spaced slots in the magazine, and the magazine is indexed each time a slide is viewed. These magazines generally accommodate thirty slides. One of the disadvantages with these magazines is that they are not too suitable for storage since the top is open and exposed to dirt and dust. Also, the majority of slide sequences or groups average ten or twelve slides and the larger size magazine is not too convenient.

There has also appeared in the prior art smaller box type magazines accommodating ten or twelve slides which are substantially enclosed by the box, the box having slots to permit removal and insertion of the slides. Some of these box type magazines have elaborate mechanisms for taking a slide out of a stationary box, then transporting it to the back of the box, then replacing it in the box. This type mechanism is quite complicated and has a great tendency to jam the slides. Another type mechanism is one wherein the box is reciprocated with respect to the projector. This type is shown by the French Patent No. 667,104.

The primary problem of moving slides in and out of the box type magazine is that the slides are not separated by dividers in the magazine, but slide on top of one another. Since the slides are composed of a relatively thick rim portion surrounding the slide, when the slides are pushed back and forth to and from a stack, there is a great possibility of interference between the parallel edges of the slides, that is, both the outside and inside edges of the rim portions. Heretofore, for this reason, the box type devices have not been practical due to the jamming of the slides. This difficulty is further complicated by the fact that as the slides are handled, they tend to bend along a center axis and also to become dog-eared, worn, and bent at the corners which magnifies the possibility of their mutual interference.

The present invention solves this difficulty by providing means for moving a slide to and from the stack with a rotational motion so that interfering edges of the slides are not in parallel relation and the possibilities of interference between the edges of the slides are eliminated. The present invention rotates the moving slides by means of a novel eccentrically mounted pawl and camming means in the projector. The slides are sliced off the stack with a twisting motion and replaced in the stack with the same motion, in reverse.

Accordingly, a principal object of the invention is to provide new and improved slide projector or viewer means.

Another object of the invention is to provide new and improved slide projector or viewer means of the type having a box slide magazine.

Another object of the invention is to provide new and improved slide projector or viewer means of the type having a box slide magazine which is adapted to reciprocate in and out of the projector.

Another object of the invention is to provide new and improved box slide magazine means having means to prevent interference between the slides.

Another object of the invention is to provide new and improved box slide magazine means having means to prevent interference between the slides comprising means to rotate the slides being moved relative the stack.

Another object of the invention is to provide new and improved box magazine means.

These and other objects of the invention will become apparent from the following specification and drawings, of which:

Figure 1:
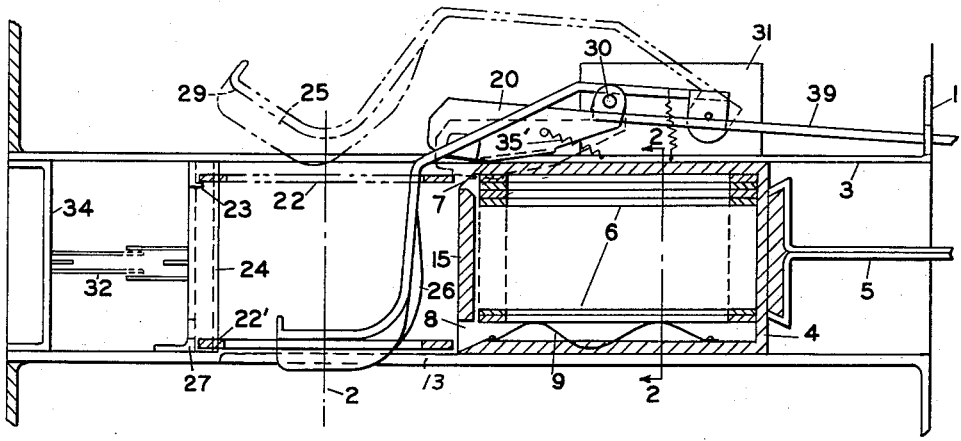
Figure 1 is a plan view partially cut away showing an embodiment of the invention.
Figure 2:
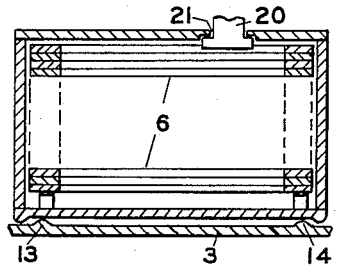
Figure 2 is a sectional view of Figure 1 along the line 2—2.
Figure 3:
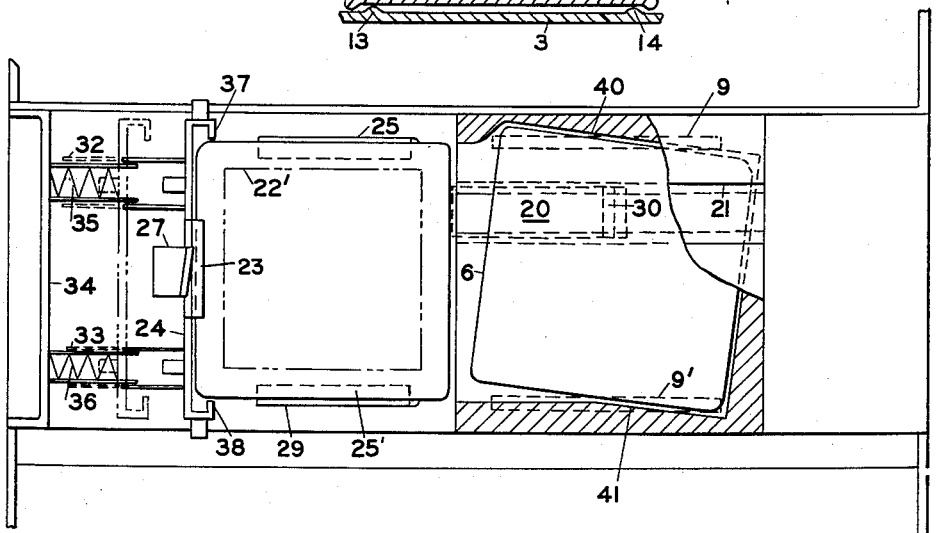
Figure 3 is an elevation view of Figure 1 partly in section.

Referring to Figure 1, the invention comprises generally a main frame 1 having an optical or work axis 2 and having a track 3 with ribs 13 and 14 perpendicular to the optical axis adapted to accommodate a slide box magazine 4, the box being adapted to be pushed in and out of the main frame along the track 3 by means of the removable handle 5. The box contains a stack of slides 6 and has slots 7 and 8 for the removal and insertion of slides as the box is moved in and out of the main frame. Springs 9, 9' in the box hold the slides in place.

The interior surfaces 40, 41 of the box are shaped to hold the stack of slides 6 at an angle to the direction of travel of the box and also at the same angle to the viewing position. The purpose of this angle is to enable the slides to be removed from and inserted in the stack with a twisting sliding motion so that interfering edges both on the inside and outside of the slide mounts will not pass each other in parallel relation.

A pawl member 20 is pivotally mounted on shaft 30 in bracket 31 of the main frame and spring loaded by spring 35'. There is a slot 21 on the side of the box with a recess on each side and the pawl enters the slot behind the first slide when the box is pushed completely in. The side of the box is notched to permit entry of the pawl. The purpose of the recessed slot is to permit the pawl to slide back over the side of the box when the box is pushed in and then enter the slot. As the box is pushed in, the pawl 20 is cammed to the outside of the box by the slanting edge of the front wall of the box adjacent slot 7. This prevents the pawl from scratching the film. When the box is pulled out, the pawl removes the first slide with a rotational movement since the pawl is located off the center of the box. This slide 22 will be held at its free end momentarily by the clip 23. The purpose of the clip is to prevent the free end from falling down so that the slide might possibly become wedged between the guide member 24 and the end 15 of the box. As the box is moved out, the curved pusher arm 25, which is pivotally mounted and spring loaded on the projector bracket 21, then pushes the slide 22 to the viewing position as shown by the slide 22', Figure 1. Actually, there are two pusher members 25 and 25', one at the top of the slide and one at the bottom, and they are preferably connected together. The pusher members 25 and 25' have a right angle lip 29 which is adapted to fit over or under the edge of the slide as the case may be. There is preferably a camming surface 26 on the pusher member to facilitate rotating the pusher member when the box is pushed in.

After the slide is viewed when the box is again pushed in, the slide 22' enters the box through the slot 8 and slides over the spring 9 onto the stack with a twisting motion which is imparted to the slide by means of the slanting contact surface of cam 27 which is mounted on the main frame. The guide member 24 is yieldably mounted on telescoping support members 32 and 33 which are mounted on the bracket 34. The guide member 24 is spring loaded by the springs 35 and 36. The purpose of the movement of the guide member 24 is to prevent interference with the box when it is in the "in" position and also to line up the slide with guide edges 37, 38 as the box is pulled out. For proper operation, it is necessary to have a sufficient number of slides in the box to maintain pressure on the spring 9. A lever 39 is connected to the pawl 20 to release the pawl after the last slide is viewed in order to remove the box with a complete set of slides. The present box magazine eliminates any need for a separate shutter.

The invention is described in connection with a viewer or projector but is not so limited as it may be used for other purposes.

Therefore, the present invention provides a removable box magazine for holding a convenient number of slides in a desired sequence and provides means for removing and inserting slides from and into the stack with a twisting rotational movement to eliminate interference between parallel edges of the slides.

I claim:

In a slide device having a work axis and a track perpendicular to said axis to accommodate a sliding magazine box: a magazine box on said track, the side of said box adjacent said work axis having input and output slots for slides adjacent the rear and front sides respectively of said box, said box having interior walls shaped and adapted to contain a plurality of slides parallel to and in angled position relative the direction of travel of said box, said angled position of said slides being an upward tilt of the lower corners of said slides adjacent said work axis, an off center slot in the front side of said box parallel to said track, pawl means in said device adapted to enter said off center slot to remove a slide from said box as said box is moved away from said work axis, said off center pawl means and said interior walls rotating from said tilted position said slide being removed from said box as said box is pulled out, pusher means rotatably mounted in said device to position said slide in work position, said box being adapted to pick up said slide on its next inward travel, and means to prevent interference between said slides, including means to impart rotational movement to said slide being moved relative said stack, said last means including cam means in said device to rotate said slide being inserted in said box, the interior walls of said box being adapted to cooperate with said cam to rotate said incoming slide as said box is pushed in.

References Cited in the file of this patent

UNITED STATES PATENTS

| | | |
|---|---|---|
| 706,651 | Goerz | Aug. 12, 1902 |
| 1,215,694 | Osborne | Feb. 13, 1917 |
| 2,812,056 | Jenkins | Nov. 5, 1957 |
| 2,864,190 | Horton | Dec. 16, 1958 |

FOREIGN PATENTS

| | | |
|---|---|---|
| 667,104 | France | June 3, 1929 |